March 3, 1942.　　　F. H. MALONEY　　　2,275,051
DISPENSING DEVICE
Filed Sept. 29, 1938
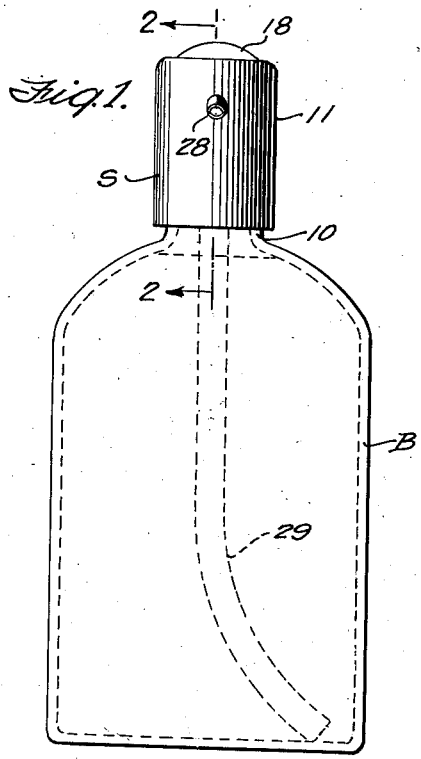
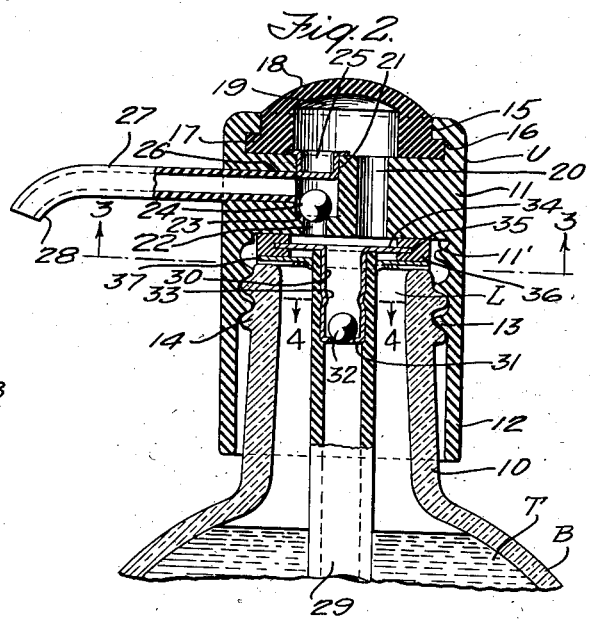
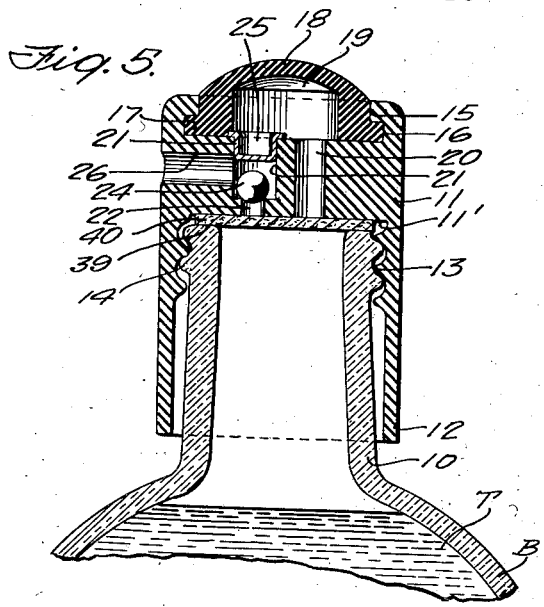
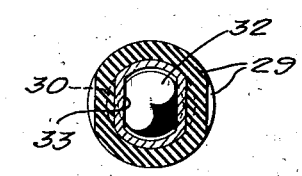
INVENTOR
FRANK H. MALONEY
BY
Moses & Nolte
ATTORNEYS Patented Mar. 3, 1942

2,275,051

UNITED STATES PATENT OFFICE 2,275,051

DISPENSING DEVICE

Frank H. Maloney, Elmhurst, Long Island, N. Y., assignor to Brass Goods Manufacturing Co., Brooklyn, N. Y., a corporation of New York Application September 29, 1938, Serial No. 232,327

11 Claims. (Cl. 221—85)

This invention relates to a bottle stopper and more particularly to a stopper provided with manually controlled means for determining the rate or quantity of flow of a liquid from the bottle. The invention has particular utility when applied to a stopper for a bottle or other container holding a liquid which it is desired to dispense in small amounts, such as a few drops, such as cold cream, shaving lotion and similar cosmetic lotions, but it will be understood that the invention is not limited to dispensing liquids of this type but can be used with equal facility for dispensing any liquid in small, controlled amounts.

It is an object of the invention to provide a bottle or other container stopper with an improved device within the body of the stopper whereby liquid may be delivered therefrom under the control of the pressure of a thumb or finger thereon.

Another object of the invention is to provide a device for dispensing liquid from a closed container with a simple means whereby air is admitted to the container simultaneously with the delivery of liquid therefrom.

Another object of the invention is to provide a device of the type characterized which may be used to deliver liquid in drops or in a small stream and in different quantities.

A still further object is to provide a liquid dispenser adapted for easy attachment to the top of a container and having valves as component parts thereof which are located above the level of the liquid in the container.

A still further object is to provide a dispensing device with a depending valve portion and a discharge tube which are separatable from a main stopper portion during shipment of the device and the bottle of liquid it is designed to dispense, so that the main stopper portion may be utilized to seal the bottle in cooperation with a sealing gasket interposed between the top of the bottle and the stopper.

A further cognate object of the invention is to provide a dispensing device of the class described which is simple and rugged in construction, inexpensive to manufacture and durable and certain in operation.

For a better understanding of the invention reference is made to the accompanying drawing in which the same reference characters are used to designate corresponding parts in the different figures.

Fig. 1 is a front view of a bottle having a liquid dispenser embodying the invention attached to the top thereof;

Fig. 2 is a sectional view of the upper portion of the bottle and the attached dispenser taken on line 2—2 of Fig. 1;

Fig. 3 is a sectional view through the central portion of the dispenser taken on line 3—3 of Fig. 2;

Fig. 4 is a sectional view taken through line 4—4 of Fig. 2 and showing certain features of the supply tube and lower valve of the dispenser and;

Fig. 5 is a sectional view showing the cap portion of the dispenser as applied to the neck of a bottle to form a tight closure therefor.

Referring first to Figs. 1 and 2, the dispensing device S is shown attached to the neck portion 10 of a bottle B containing a liquid T which it is desired to dispense in small, controlled amounts. The dispensing device S is preferably made in upper and lower sections U and L respectively, which are separable from each other for a purpose to be later described. The upper portion U comprises a cap member 11 of substantially cylindrical shape and is hollowed out interiorly to provide a flat surface 11" and a downwardly extending annular skirt portion 12, the upper end of skirt portion 12 being preferably provided with a threaded portion 13 adapted to screw onto the threaded portion 14 provided at the upper end of neck 10 of the bottle. An opening 15 is provided in the upper end of cap member 11 which is undercut as shown at 16 to engage an outwardly extending flange 17 provided at the lower end of a hollow deformable lip 18 whose upper surface is preferably convex, as shown. Lip 18 is formed of a resilient, flexible material such as rubber and is hollow to provide a chamber 19 which is in communication with the liquid T through a bore 20 formed in cap member 11. Cap 11 is also provided with a bore 21 whose lower portion is of smaller diameter as shown at 22 to provide a shoulder portion 23 which serves as a valve seat for a ball valve 24, a depending retaining member 25 being fitted in the upper end of bore 21 to seal the same and to retain the ball 24 within the bore for limited movement therein. Cap member 11 is also provided with a horizontal bore 26 which communicates with bore 21, as shown, and in which may be freely inserted a tubular discharge member 27 whose end is preferably extended downwardly a short distance as shown at 28. It will be seen that the ball retaining member 25 also serves as a stop to limit the end of tube 27 when it is properly in communication with bore or passage 21.

The lower separable portion L of the dispensing unit is shown as comprising a flexible rubber tube 29 carrying at its upper end a tubular cylindrical lower valve member 30 whose lower end is turned inwardly as shown at 31 to provide a valve seat for a ball valve 32 and the sides of valve member 30 being deformed inwardly to provide opposed projections 33 which serve to retain ball valve 32 for limited motion within tubular member 30. At its upper end member 30 is provided with a horizontally extending, thin flange 34 which is snugly seated in a recess 35 provided in an annular flexible rubber washer 36 whose upper surface engages the flat surface 11' of cap 11 and whose lower surface engages the upper surface of a metal washer 37 which is provided with a series of radially extending corrugations 38, the lips or lowest points of which are held in engagement with the upper end surface 39 of the neck 10 of the bottle. The purpose of corrugations 38 is to provide passage for admitting air into the interior of the bottle, as the liquid T is dispensed therefrom.

The upper and lower units U and L of the dispensing device are retained in properly assembled relation by inserting tube 29 into the bottle and turning cap member 11 whose threads 13 engage the threads 14 of the bottle neck to advance the surface 11' of cap member 11 into firm engagement with washer 36. Upon depressing the lip 18 by a finger or thumb, some of the air within chamber 19 will pass down bore 20, raise ball 24 from its seat 23 and pass out tube 27. Upon lip 18 moving upwardly due to its resiliency, ball 24 engages its seat 23 to prevent the entrance of air through tube 27 and the atmospheric pressure within the bottle forces some of the liquid up tube 29, this liquid being replaced by air which enters between the threads 13 and 14 and between the corrugations 38. The depression of lip 18 is continued until the liquid fills tube 30 and is at the level of ball 24, ball valve 32 preventing the raised liquid from returning down tube 29. When the liquid, after the initial filling operation described, has reached the level of the bore of outlet tube 27, one or more drops or other small controlled amount of the liquid may be dispensed through the end 28 of tube 27 in accordance with the extent of depression of lip portion 18, the amount dispensed being under easy control of the operator. All parts of the dispensing unit are preferably made of material which is chemically inert to the particular liquid being dispensed; for certain liquids it has been found that the rigid parts of the unit may suitably be made of metal while for other liquids, moulded plastic materials of suitable composition may be employed.

When shipping the dispensing unit with a bottle of liquid, the lower portion L and also the discharge tube 27 may be removed and packed in the same container as the bottle, for example, a cardboard carton. In order to retain the liquid during shipment and until it is desired to utilize it, the top of the bottle is sealed by a resilient washer 40 made of cork or other desired material and disposed between the upper edge portion 39 of the neck of the bottle and the flat surface 11' of cap member 11, the cooperating threaded portions 13 and 14 of the cap and bottle respectively serving to hold washer 40 in firm engagement with the end of the bottle.

I have described what I believe to be the best embodiments of my invention. I do not wish, however, to be confined to the embodiments shown, but what I desire to cover by Letters Patent is set forth in the appended claims.

I claim:

1. A device for dispensing fluid comprising in combination, a cap member provided with two passages extending from its upper to its lower surfaces, a vertically arranged tube having its upper end in communication with said passages and its lower end immersed in the fluid, a valve arranged to permit the passage of fluid upwards through one of said passages and to prevent the passage of fluid in the reverse direction, a horizontal discharge tube having its end in communication with said one passage, and a resilient member connected to said cap member above the level of the fluid and extending above the other of said passages whereby compression of said resilient member displaces a portion of the air contained in said other passage.

2. A device for dispensing fluid comprising in combination, a cap member provided with an opening in its lower side and a passage extending from its upper to its lower surface, a valve seated in said opening, a vertically arranged tube having its upper end in communication with said passage and its lower end immersed in the liquid, a valve mounted in said tube and arranged to permit the upward passage of liquid therethrough but to prevent the passage of liquid in the reverse direction, and resilient means connected to the top of said cap member above said passage and adapted to displace the air contained in said passage.

3. The combination of cooperating elements as set forth in claim 2 in which the opening in the lower side of the cap member has a reduced lower portion to thereby provide a shouldered valve seat and in which the valve in said opening consists of a ball resting on the shouldered valve seat and means for sealing the upper end of said opening.

4. A device for dispensing fluid from a container having a vertically extending neck portion comprising in combination, a cap member provided with means for interlocking engagement with the container neck portion, a vertically arranged tube arranged to be supported by the container neck portion and having its lower end immersed in the fluid, an opening in the lower portion of said cap member and in communication with the upper end of said tube, a valve seated in said opening, means to prevent the passage of the fluid downwards through said tube and a flexible member secured to said cap member above the level of the fluid and arranged to reduce the air pressure in the upper portion of said tube whereby the fluid rises in the tube under the action of the atmospheric pressure.

5. A device for dispensing fluid from a container having a vertically extending neck portion comprising in combination, a cap member provided with means for interlocking engagement with the container neck portion, a washer disposed between the lower surface of said cap member and the upper surface of the container neck portion, a vertically arranged tube having its upper end connected to said washer and its lower end immersed in the liquid, a valve member seated in said tube and arranged to prevent the passage of fluid downwards therein, said cap member being provided with a discharge orifice in communication with the upper end of said tube and a flexible member secured to said cap member and adapted to eject a controlled amount of the fluid from the discharge orifice in accordance with the extent to which the flexible member is deformed.

6. A device for dispensing fluid from a container having an upwardly extending neck portion comprising in combination, a cap member provided with means for interlocking engagement with the container neck portion, a washer disposed between the lower surface of said cap member and the upper surface of the container neck portion, a flexible tube having its lower end immersed in the fluid, a tubular member secured to the upper end of said flexible tube and provided with an outwardly extending flange whose edge portion is secured to said washer, a valve disposed in said tubular member, said cap member being provided with a discharge orifice disposed above said washer, and a flexible member secured to said cap member and adapted to eject a controlled amount of the fluid from the discharge orifice in accordance with the extent to which the flexible member is deformed.

7. A device for dispensing fluid from a container comprising in combination, a cap member provided with a discharge opening having a reduced lower end portion to provide a valve seat, a ball disposed in said opening and adapted to engage said valve seat, a solid closure member adapted to retain said ball and disposed across the upper end of the discharge opening, a substantially horizontal discharge tube in communication with the discharge opening and whose inner end is adapted to contact said closure member and is limited thereby in movement towards the said discharge opening and means mounted on the top of said cap member for ejecting a controlled amount of the fluid from said discharge tube.

8. A device for dispensing fluid from a container having an upwardly extending neck portion comprising in combination, a cap member provided with a discharge opening and screw means for interlocking engagement with the container neck portion, a flexible washer disposed between the lower surface of said cap member and the upper surface of the container, means mounted on said cap member for elevating a controlled amount of the fluid into said discharge opening and means for admitting air into said container disposed between said washer and the upper surface of the neck portion of the container.

9. The combination of cooperating elements as set forth in claim 8 in which the means for admitting air into the container comprises a washer provided with a plurality of radially disposed corrugations.

10. The combination of cooperating elements as set forth in claim 8 in which a thin solid washer is provided to replace said flexible washer said solid washer being adapted to be compressed between the lower surface of the cap member and the upper surface of the neck portion of the container and thereby seal the upper end of the container.

11. The combination of cooperating elements as set forth in claim 2 in which the upper end of the cap member is provided with an undercut groove and the resilient means is provided with an integral flange seated in said groove.

FRANK H. MALONEY.